Nov. 12, 1957 R. POLK, JR 2,812,845
FRUIT-POSITIONING DEVICE FOR FRUIT-PROCESSING MACHINE
Filed Jan. 5, 1954 2 Sheets-Sheet 2

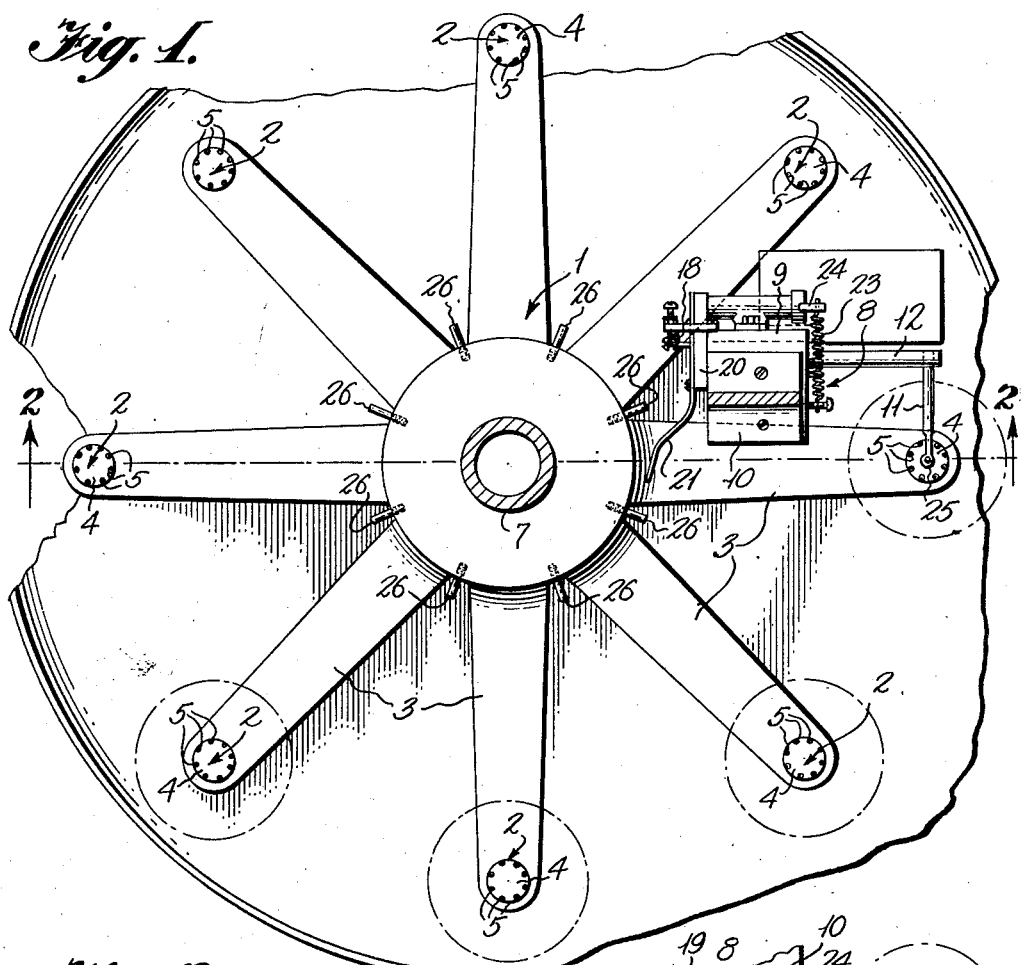
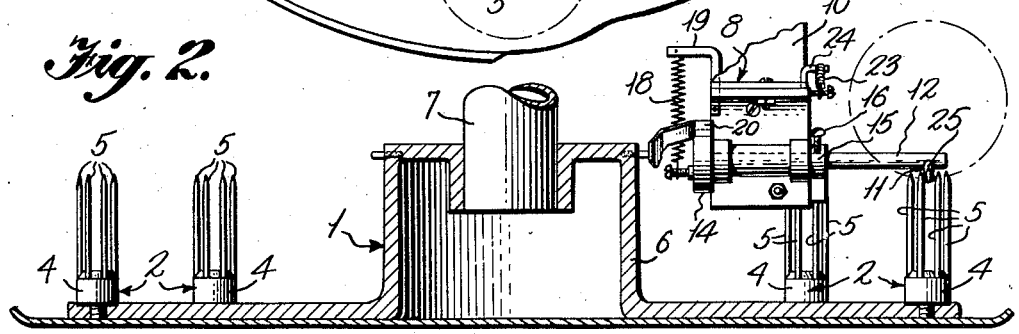

INVENTOR
Ralph Polk, Jr.

BY Mason, Fenwick & Lawrence
ATTORNEYS

United States Patent Office 2,812,845
Patented Nov. 12, 1957

2,812,845

FRUIT-POSITIONING DEVICE FOR FRUIT-PROCESSING MACHINE

Ralph Polk, Jr., Tampa, Fla.

Application January 5, 1954, Serial No. 402,249

3 Claims. (Cl. 198—29)

This invention relates to devices for assuring proper positioning of fruit upon the supporting means of fruit processing machines, particularly citrus fruit sectionizing machines.

Machines for separating citrus fruit into segmental sections for canning are well known. An example of such a machine may be found in U. S. Patent No. 2,129,101. These machines employ a revolvable turret which includes a spider having a plurality of arms with fruit-engaging and holding means located at the end of each arm. The holding means usually consists of a circular cluster of fruit-impaling pins. The turret, with the fruit positioned thereon, is rotated step by step through an amplitude of 45° through the various stations of the machine where the several operations are sequentially performed. In order for the fruit to be properly sectionized it must be precisely centered upon the holding means. This has been rather difficult due to the fact that the stem end of the fruit is positioned downwardly and, therefore, out of sight when the fruit is placed upon the impaling pins forming the fruit-holding spindle. If the fruit is not properly centered so that the core is accurately located within the cluster of impaling pins, the spindle cannot retain the fruit against the radial outward forces involved in removing the sections.

The object of the present invention is to provide a device upon which the fruit can be accurately centered, and which will guide the fruit with absolute accuracy into engagement with the pins of the spindle.

Another object of the invention is to provide a device of this nature which is movable to a position where the operator may have full view of the end of the fruit while positioning it upon the centering device.

Yet another object is to provide a centering device in which the rotatable guiding element will be held in position below the impaled fruit during a portion of the succeeding indexing movement of the turret, and will then be returned automatically to its position to receive another fruit.

Still another object is to provide a device of this character which is extremely simple in structure and operation and can be added to the present machine at small cost.

Other objects of the invention will appear from the following description of one practical embodiment thereof when taken in conjunction with the drawings which accompany, and form part of, this specification.

In the drawings:

Figure 1 is a horizontal section through the turret of a citrus fruit sectionizing machine, showing the centering device in position;

Figure 2 is a vertical section taken on the line 2—2 of Figure 1;

Figure 3:
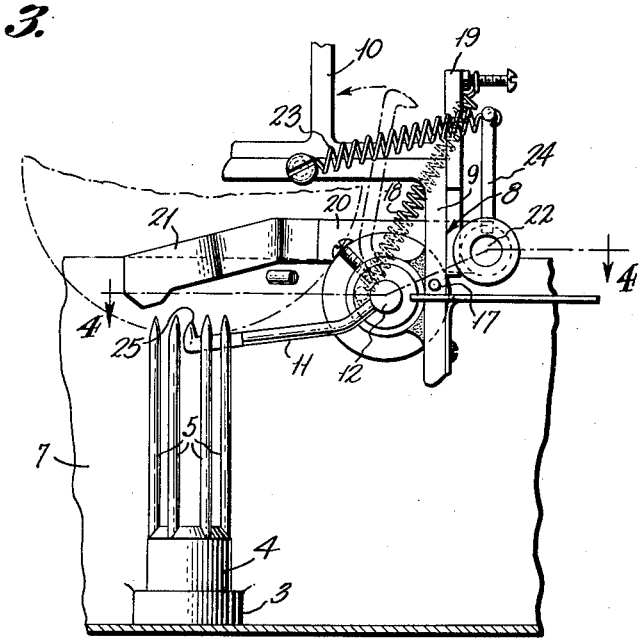
Figure 3 is an end elevation of the centering device shown in conjunction with associated parts of the sectionizing machine; and, Figure 4 is a horizontal section taken on the line 4—4 of Figure 3.
Figure 4:
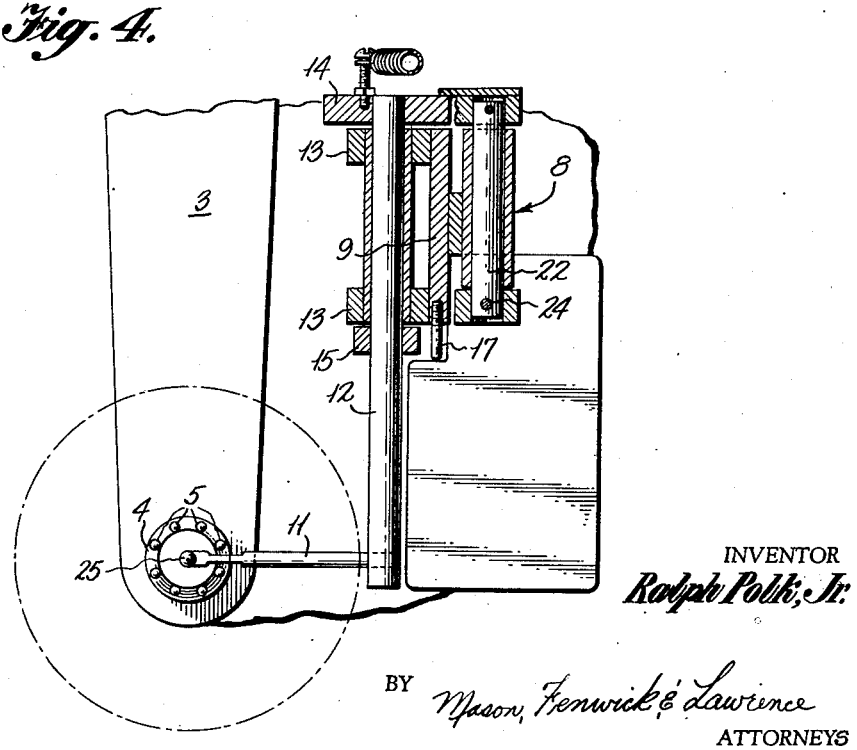

The sectionizing machine with which the present invention is adapted to operate is described in detail in Patent No. 2,129,101 and only the turret spider 1 and the fruit-supporting spindles 2 have been shown herein. The spider is shown as having eight radially projecting arms 3 so that each arm is at an angle of 45° to the next and, as previously mentioned, the turret is designed to be moved step by step through an arc of 45° to bring the respective arms to the various operating stations. The spindles are positioned at the outer ends of the arms and project vertically upward. They consist of a base 4 which supports the upwardly projecting circular cluster of impaling pins 5. The fruit is placed on the spindles with the core portion centered within the circle formed by the pins. The fruit is pressed far enough down on the pins to hold it firmly in position during the various operations. The arms of the spider project from a central hub 6 which is mounted upon the shaft 7 which imparts the intermittent movement.

The centering device 8, forming the subject matter of the present application, is mounted adjacent the loading station of the sectionizing machine. It is supported upon a bracket 9 which is screwed, or bolted, to a suitably fixed portion of the sectionizing machine, as indicated at 10. The centering device consists of a guide arm 11 which is adapted to receive the fruit and lead it to a proper position with respect to the spindles. Arm 11 is mounted upon the end of a shaft 12 which is carried in the bearings 13 mounted on the supporting angle bracket 9. The shaft 12 carries a brake drum 14 on its end opposite the guide arm 11. Brake drum 14 serves to prevent axial movement of the shaft 12 in one direction, and a collar 15 is mounted upon the shaft at the opposite side of the bearings to prevent axial movement of the shaft in the opposite direction. Collar 15 is held on the shaft by means of a set screw 16 which projects sufficiently beyond the collar to coact with a pin 17 mounted in the side of the mounting bracket 9 to serve as a limit stop to position the guide arm substantially vertical for loading. By loosening the set screw and shifting the collar circumferentially of the shaft, the loading position of the guide arm may be changed. Shaft 12 is biased toward loading position of the guide arm by means of a spring 18 connected to the brake drum 14 and having its opposite ends secured to a bracket 19 projecting upwardly from the mounting bracket 9. Thus, when the guide arm is moved from its loading position, spring 18 will tend to rotate the shaft to return the guide arm to its original position, where it will be stopped and held by engagement of the screw 16 with the limit pin 17.

In order to prevent any undue force being applied to the underside of the fruit by the guide arms, brake mechanism is provided to hold the shaft against rotation. This consists of the brake shoe 20 carried on a trip lever 21 mounted upon a shaft 22 fixed in journals on the back of the mounting bracket 9. The brake shoe is held in contact with the drum 14 by means of a spring 23 connected to a pin 24 projecting upwardly from a shaft 22 and to the mounting bracket 9. The tension of the spring 23 will determine the braking effect of the brake shoe upon the drum.

The guide arm 11 may be of any desired shape and has its outer end bent at right angles to the axis of the arm to project away from the fruit-supporting spindle. This bent-over portion is formed into a centering point 25 for piercing the fruit at its core. The point will project horizontally when in the fruit-receiving, or loading, position. This position of the centering point will permit the operator to view the stem end of the fruit as the core of the fruit will be horizontal, and he may place the fruit against the centering pin so that the pin will puncture the fruit at its exact center. By pressing the fruit against the guide arm the arm will be caused to rotate and guide the fruit on to the impaling pins of the spindle.

The entire centering device is so mounted upon the machine with respect to the position of the spindle at the loading station that when the guide arm is rocked downwardly its centering pin will move into the cluster of impaling pins at the exact center thereof so that the fruit will be guided accurately on to the impaling pins with the core properly positioned within the cluster of pins. In other words, the pivotal axis of the guide arm will be horizontally spaced from the horizontal center of the loading position spindle a distance equal to the spacing of the centering point from the pivotal axis, and the vertical plane of rocking movement of the arm will include the center of the spindle. When the fruit has been placed on the spindle, the guide arm will occupy a substantially horizontal position and, due to the brake mechanism, will remain in this position without exerting upward force on the fruit. On the next indexing motion of the turret, the spindle bearing the fruit will move onward away from the guide arm and centering pin. During this movement the trip lever 21 will contact one of a series of pins 26 projecting from the hub 6 of the spider which will lift the trip arm, removing the brake shoe from the drum and permit the guide arm to return to its upright position under the influence of the spring 18. As soon as the trip arm passes off of the pin 26, spring 23 will cause the brake shoe to engage the brake drum 14.

While in the above one practical embodiment of the invention has been disclosed, it will be understood that the precise details of structure described and shown are merely for purposes of illustration and that various changes may be made within the scope of the appended claims.

What is claimed is:

1. A device for positioning fruit upon a fruit processing machine of the type having means for engaging and holding the fruit, said device comprising, a support to be attached to said processing machine, a horizontal shaft journalled upon said support, a guide arm normal to and carried by said shaft and rotatable therewith in a vertical plane which will include the center of said fruit engaging and holding means of said machine, means to bias said guide arm toward an upright loading position, a centering point projecting from said arm substantially horizontally when said arm is in loading position, said centering point being spaced from the axis of said shaft a distance which will be equal to the horizontal distance from the axis of said shaft to the horizontal center of said engaging and holding means when said device is mounted upon said machine, whereby fruit impaled upon said centering point will upon rocking movement of said arm be brought into engagement with the fruit engaging and holding means with the point of impaling of the fruit at the center of the engaging and holding means, a brake drum mounted upon said shaft, and a brake shoe yieldingly held in engagement with said brake drum to overcome said arm biasing means and hold said arm in other than loading position.

2. In a fruit positioning device as claimed in claim 1, means to move said brake shoe from said brake drum to permit said arm to return to loading position.

3. A device for positioning fruit upon a fruit processing machine having a fruit mounting spindle including a circular cluster of pins for impaling and holding fruit to be processed, said device comprising, a support attached to said machine adjacent said cluster of impaling pins, a guide arm pivotally mounted upon said support for rocking movement in an arc which includes the center of the circle formed by said impaling pin cluster at the impaling end thereof, a centering pin mounted on said arm to project rearwardly therefrom when said arm is moving toward said pin cluster, said centering pin being positioned upon said arm to pass through the center of the impaling pin cluster when the arm is rocked, whereby fruit held upon said centering pin will be led to said impaling pin cluster upon rocking of said arm and said centering pin may move into said cluster and away from the fruit to leave the fruit impaled upon said pin cluster with the point on the fruit engaged by the centering pin at the center of the circle of the impaling pin cluster.

References Cited in the file of this patent
UNITED STATES PATENTS

| 1,048,151 | Gregory | Dec. 24, 1912 |
| 2,156,771 | Sadoff | May 2, 1939 |
| 2,556,122 | Thompson | June 5, 1951 |
| 2,672,229 | Ewald | Mar. 16, 1954 |